United States Patent Office 3,732,253
Patented May 8, 1973

3,732,253
α-HALO-PHENYLACETAMIDES
Bruno Cavalleri and Anna Sardi, Milan, Italy, assignors to Gruppo Lepetit S.p.A., Milan, Italy
No Drawing. Filed Dec. 30, 1970, Ser. No. 102,932
Int. Cl. C07d 13/10
U.S. Cl. 260—340.5
13 Claims

ABSTRACT OF THE DISCLOSURE

α-Halo-phenylacetamide compounds, such as N-phenethyl-α-fluorophenylacetamide, N-(4-ethoxyphenethyl)-α-fluorophenylacetamide and N-(3,4-dimethoxyphenethyl)-α-bromophenylacetamide, are prepared by the reaction of an α-halo substituted phenylacetyl halide with a substituted phenethylamine in the presence of an anion acceptor such as a tertiary amine. The α-halo-phenylacetamide compounds have pharmacological activity on the cardiovascular system, and are particularly active as coronary dilators.

SUMMARY OF THE INVENTION

This invention is concerned with α-halo-phenylacetamides. More particularly, the compounds with which the invention is concerned are α-halo-N-phenethyl-phenylacetamides of the formula

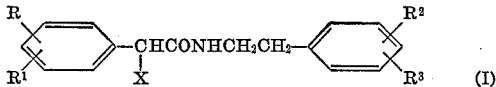

wherein X represents halogen; R, $R^1$, $R^2$ and $R^3$ each independently represent hydrogen, halogen, nitro or lower alkoxy; and each of the pairs of R and $R^1$ together and $R^2$ and $R^3$ together also independently represent methylenedioxy.

In the present specification and claims, the expressions "halo" and "halogen" as applied to Formula I, mean and refer to the halogen moieties, fluoro, chloro, bromo and iodo, and the term "lower alkoxy" is employed to refer to lower alkoxy moieties of from one, to two, to three, to four carbon atoms.

The compounds of the invention are crystalline solids or liquids which can be obtained in a racemic mixture or in an optically active form. The compounds have been found to exhibit a high degree of activity on the cardiovascular system, particularly as coronary dilators. Their activity is associated with a low toxicity. They can be administered to animals, particularly mammals in amounts sufficient to effect coronary dilation or increased coronary blood flow by conventional routes of administration. A preferred group of compounds comprises those compounds of Formula I wherein the halogen moiety is fluoro, chloro or bromo and the lower alkoxy moiety is methoxy. Another preferred group comprises those compounds corresponding to Formula I wherein, when both of R and $R^1$ or both of $R^2$ and $R^3$ are halogen or lower alkoxy, both R and $R^1$ or both $R^2$ and $R^3$, as the case may be, are the same halogen or lower alkoxy moiety. It is also preferred that the substituents R, $R^1$, $R^2$ and $R^3$ be in the 3- or 4- positions on their respective phenyl moieties.

The compounds of the invention can be prepared by the reaction of an acyl halide, such as the acyl chloride of a substituted arylacetic acid of the formula

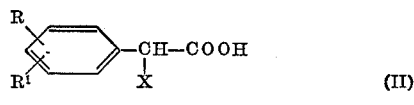

with an aralkylamine of the formula

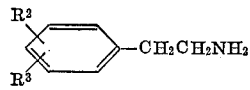

In Formulae II and III above, the expressions X, R, $R^1$, $R^2$ and $R^3$ have the significance set out above with respect to Formula I. The reaction proceeds when the acyl halide and aralkylamine reactant are contacted and mixed in the presence of an inert organic liquid as a reaction medium and in the presence of an anion acceptor. The reactants, reaction medium and anion acceptor can be contacted and mixed at temperatures from room temperature to the boiling point of the reaction mixture for a time sufficient to produce the desired product.

According to one embodiment of the invention, about one molar proportion of the selected α-substituted arylacetyl chloride is heated at the boiling temperature under reflux in an inert organic solvent with one molar proportion of the selected aralkylamine in the presence of one molar proportion of tertiaryamine as anion acceptor.

The added tertiaryamine can be the same aralkylamine used as a starting material; and it will then be necessary to use two molar proportions of the aralkylamine. The reaction can be complete after from about 2 to about 15 hours, after which the product is recovered from the reaction mixture through common procedures. For instance, after having filtered the amine hydrochloride and after having washed the organic solvent successively with a slightly acid and a slightly alkaline water solution and finally with water, the organic phase is well dried and the solvent distilled off. The product is obtained as a residue which is then purified by distillation or recrystallization according to whether it is obtained as a liquid or solid.

According to another embodiment of the invention, one molar proportion of a substituted arylacetyl chloride is refluxed for about 2 to 15 hours with one molar proportion of a hydrohalide of the aralkylamine in an inert organic solvent, in the presence of two molar proportions of an amine as anion acceptor. After evaporation of the solvent the residue is worked up by distillation or crystallization. A large number of aralkylamides of α-substituted arylacetic acids can be prepared through the above procedures. Since α-substituted arylacetic acids may exist in a racemic or in an optically active form, the arylacetamide obtained therefrom may belong to one of the above mentioned stereoisomeric species, either of which can be employed as a coronary dilator, according to the invention. By way of simple indication a list of such compounds is given hereinbelow, without intention of establishing the limits of our invention.

-N-phenethyl-α-fluorophenylacetamide
-N-(4-methoxyphenethyl)-α-fluorophenylacetamide
-N-(4-ethoxyphenethyl)-α-fluorophenylacetamide
-N-(4-fluorophenethyl)-α-fluorophenylacetamide
-N-(4-chlorophenethyl)-α-fluorophenylacetamide
-N-(4-nitrophenethyl)-α-fluorophenylacetamide
-N-(3,4-dichlorophenethyl)-α-fluorophenylacetamide
-N-(3,4-dimethoxyphenethyl)-α-fluorophenylacetamide
(—)-N-(3,4-dimethoxyphenethyl)-α-fluorophenylacetamide
-N-(3,4-methylenedioxyphenethyl)-α-fluorophenylacetamide
-N-(3,4-dimethoxyphenethyl)-α-fluoro-3,4-dimethoxyphenylacetamide
-N-(3,4-dimethoxyphenyl)-α-fluoro-3,4-methylenedioxyphenylacetamide
-N-(3,4-dimethoxyphenethyl)-α-fluoro-3,4-dichlorophenylacetamide -N-(4-methoxyphenethyl)-α-fluoro-3,4-dimethoxy-
phenylacetamide
-N-(4-methoxyphenethyl)-α-fluoro-3,4-methylene
dioxyphenylacetamide
-N-(4-methoxyphenethyl)-α-fluoro-3,4-dichlorophenyl-
acetamide
-N-(3,4-dichlorophenethyl)-α-fluoro-3,4-dimethoxy-
phenylacetamide
-N-(3,4-dichlorophenethyl)-α-fluoro-3,4-dichlorophenyl-
acetamide
-N-(3,4-dimethoxyphenyl)-α-chlorophenylacetamide
-N-(3,4-dichlorophenethyl)-α-chlorophenylacetamide
-N-(4-chlorophenethyl)-α-chlorophenylacetamide
-N-(4-methoxyphenethyl)-α-chlorophenylacetamide
-N-(4-fluorophenethyl)-α-chlorophenylacetamide
-N-(3,4-dimethoxyphenethyl)-α-chloro-3,4-dimethoxy-
phenylacetamide
-N-(3,4-dichlorophenethyl)-α-chloro-3,4-dichlorophenyl-
acetamide
-N-(3,4-dimethoxyphenethyl)-α-chlorophenylacetamide
-N-(3,4-dichlorophenethyl)-α-bromophenylacetamide
-N-(3,4-dimethoxyphenethyl)-α-bromo-3,4-dimethoxy-
acetamide
-N-(4-chlorophenethyl)-α-bromophenylacetamide
-N-(4-fluorophenethyl)-α-bromophenylacetamide
-N-(4-methoxyphenethyl)-α-bromophenylacetamide
-N-(4-nitrophenethyl)-α-bromophenylacetamide

DESCRIPTION OF PREFERRED EMBODIMENTS

In order to further illustrate the invention and how it can be adavntageously performed, the following examples are given, referring to the preparation of some representative compounds of the invention.

Example 1.—N-phenethyl-α-fluorophenylacetamide

To a solution of 17.25 grams of α-fluorophenylacetyl chloride in 250 milliliters of benzene, 26.6 grams of phenethylamine in 150 milliliters of benzene are added at room temperature. The mixture is heated at the boiling temperature under reflux for two hours; then it is cooled and filtered. The filtrate is washed with dilute aqueous hydrochloric acid, then with dilute aqueous sodium bicarbonate and finally with water. After drying over sodium sulfate the solvent is distilled off and the solid residue is recrystallized from a 1:1 mixture of diethyl ether and petroleum ether.

The N-phenethyl-α-fluorophenylacetamide product is found to melt at 70°–71° C. 23 grams of the product are obtained, representing a 90 percent yield based on the amount of starting materials employed.

Example 2.—N-(4-methoxyphenethyl)-
α-fluorophenylacetamide

To a solution of 17.25 grams of α-fluorophenylacetyl chloride in 250 milliliters of benzene, 16.5 grams of 4-methoxyphenethylamine and 11 grams of triethylamine dissolved in 250 milliliters of benzene are added. The mixture is heated at the boiling temperature under reflux for 6 hours. After cooling, filtering to remove the resulting precipitate and washing the organic layer with dilute acid solution, dilute alkaline solution and water, the washed organic layer is dried over sodium sulfate. The mixture is distilled to remove the solvent and the product is obtained as a residue. The product is recrystallized from a 1:1 mixture of isopropanol and diisopropyl ether, and the N-(4-methoxyphenethyl)-α-fluorophenylacetamide product is found to melt at 80°–81° C. The yield (19 grams) is calculated to be 66 percent.

Example 3.—N-(4-ethoxyphenethyl)-
α-fluorophenylacetamide

To a solution of 17.25 grams α-fluorophenylacetyl chloride in 250 milliliters of benzene, 20.2 grams of 4-ethoxy-phenethylamine hydrochloride are added, followed by a solution of 13.2 grams of trimethylamine in 100 milliliters of benzene and the mixture is refluxed for 15 hours. After cooling, filtering and washing as in the foregoing examples, the benzene solution, dried over sodium sulfate, is evaporated to dryness to obtain N-(4-ethoxyphenethyl)-α-fluorophenylacetamide product as a solid residue. The product is recrystallized from diisopropyl ether and found to melt at 90°–92° C. 18 grams of product (60 percent yield) are obtained.

Example 4.—N-(4-fluorophenethyl)-
α-fluorophenylacetamide

To a solution of 17.25 grams of α-fluorophenylacetyl chloride in 250 milliliters of benzene, 15.3 grams of 4-fluorophenethylamine and 14.3 grams of tri-isopropylamine dissolved in 250 milliliters of benzene are added. The resulting mixture is refluxed for 10 hours. The reaction mixture is then worked up as described in the foregoing examples, to obtain 20 grams (70 percent yield) of the N-(4-fluorophenethyl)-α-fluorophenylacetamide product. The product is recrystallized from diisopropyl ether and found to melt at 78°–79° C.

Example 5.—N-(4-chlorophenethyl)-
α-fluorophenylacetamide

The process described above in Example 3 is repeated using 17.25 grams of α-fluorophenylacetyl chloride, 19.2 grams of 4-chlorophenethylamine hydrochloride and 13.2 grams of trimethylamine to obtain 15 grams (51 percent yield) of N-(4-chlorophenethyl)-α-fluorophenylacetamide as a product. The product is recrystallized from disopropyl ether and found to melt at 87°–88° C.

Example 6.—N-(4-nitrophenethyl)-
α-fluorophenylacetamide

The process of Example 3 is repeated, using 17.25 grams of α-fluorophenylacetyl chloride, 20.2 grams of 4-nitrophenethylamine hydrochloride and 13.2 grams of trimethylamine. The N-(4-nitrophenethyl)-α-fluorophenylacetamide product is recrystallized from a 1:1 mixture of benzene and disopropyl ether and found to melt at 127°–128° C.

The products recited below in Examples 7–13 are prepared according to the procedures described in Example 2 or Example 3 above. The starting materials and anion acceptor employed, yields and melting points of the named products are set out below and the solvent or solvents employed in recrystallization of the product is set out in parentheses.

Example 7.—N-(3,4-dimethoxyphenethyl)-α-fluoro-
phenylacetamide

Prepared according to the process of Example 2, using 17.25 grams of α-fluorophenylacetyl chloride and 20 grams of 3,4-dimethoxyphenethylamine and 6 grams of trimethylamine. Yield 22 grams (70 percent); melting point 78°–79° C. (from diethyl ether).

Example 8.—N-(3,4-dichlorophenethyl)-α-fluoro-
phenylacetamide

Prepared according to the process of Example 3, using 17.25 grams of α-fluorophenylacetyl chloride, 22.7 grams of 3,4-dichlorophenethylamine hydrochloride and 22.21 grams of triethylamine. Yield 17 grams (55 percent); melting point 95°–96° C. (from isopropanol:diisopropyl ether 1:1).

Example 9.—N-(3,4-dimethoxyphenethyl)-α-fluoro-
3,4-dimethoxyphenylacetamide

Prepared according to the process of Example 2, from 23.25 grams of α-fluoro-3,4-dimethoxyphenylacetyl chloride, 20 grams of 3,4-dimethoxyphenethylamine and 6 grams of trimethylamine. Yield 20 grams (53 percent), melting point 118°–119° C. (from isopropanol).

Example 10.—N-(3,4-dimethoxyphenethyl)-α-fluoro-
3,4-methylenedioxyphenylacetamide Prepared according to the process of Example 2, using 21.65 grams of α-fluoro-3,4-methylenedioxyphenylacetyl chloride, 20 grams of 3,4-dimethoxyphenethylamine and 6 grams of trimethylamine. Yield 23 grams (64 percent); melting point 119°–120° C. (from isopropanol).

Example 11.—N-(3,4-dimethoxyphenethyl)-α-fluoro-3,4-dichlorophenylacetamide

Prepared as in Example 2, from 17.25 grams of α-fluoro-3,4-dichlorophenylacetyl chloride and 20 grams of 3,4-dimethoxyphenethylamine and 6 grams of trimethylamine. Yield 21 grams (77 percent), melting point 84°–85° C. (from diisopropyl ether).

Example 12.—N-(3,4-dimethoxyphenethyl)-α-chlorophenylacetamide

Prepared as in Example 2, from 18.9 grams of α-chlorophenylacetyl chloride, 20 grams of 3,4-dimethoxyphenethylamine and 6 grams of trimethylamine. Yield 25 grams (75 percent), melting point 111°–112° C. (from ethyl acetate).

Example 13.—N-(3,4-dimethoxyphenethyl)-α-bromophenylacetamide

Prepared according to the method of Example 2, from 23.35 grams of α-bromophenylacetyl chloride, 20 grams of 3,4-dimethoxyphenethylamine and 6 grams trimethylamine. Yield 18 grams (48 percent), melting point 114°–115° C. (from ethyl acetate).

Example 14.—(—)-N-(3,4-dimethoxyphenethyl)-α-fluorophenylacetamide

The process of Example 7 is repeated, using 17.25 grams of optically active (—)-α-fluorophenylacetyl chloride in lieu of racemic α-fluorophenylacetyl chloride. 16.4 grams (52 percent yield) of the named product are obtained; melting point 77°–78° C., [α]$_D^{20}$=—46.8 (chloroform 1.069 percent).

The cardiovascular activity of the compounds of the above examples was evaluated in anesthetized dogs, according to conventional procedures. In such operations, the coronary blood flow, the blood pressure, the heart rate and the heart contractile force were monitored and evaluated after intravenous administration of individual compounds in doses ranging from 0.5 to 2 milligrams of one of the compounds per kilogram of animal body weight. In such operations, the compounds of the above Examples 1–14 were found to demonstrate desirable coronary dilator effects, as indicated by a substantial and long lasting increase of the coronary blood flow rate which in some cases exceeded 100 percent, without influencing blood pressure, heart rate and heart contractile force. The toxicity of the compounds was found to be very favorable, the oral LD$_{50}$ values in mice being uniformly greater than 500 milligrams per kilogram.

The compounds may be administered in oral or parenteral form. They may be compounded in tablets, capsules or solutions by adding the usual pharmaceutical excipients such as starches, gums, sugars, fatty acids, etc. or by dissolving or dispersing them in a parenterally acceptable liquid, such as, for instance, pyrogen free distilled water or propylene glycol or mixtures thereof. They are generally administered to animals at dosage rates of from 0.5 to 3, to about 75 milligrams per kilogram per day, preferably in divided dosages.

The starting materials employed in the synthesis of the compounds of the invention can be prepared according to known procedures. For example, the α-fluorophenylacetamides can be prepared by the procedure of Cavalleri et al., Il Farmaco Ed. Scient., 23, 1127 (1968), and the other α-halophenylacetamides can be prepared by analogous procedures.

What is claimed is:
1. A compound corresponding to the formula

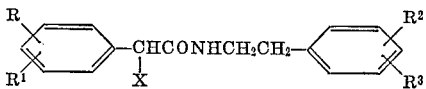

wherein X represents halogen, and R, R$^1$, R$^2$ and R$^3$ each independently represent hydrogen, halogen, nitro or lower alkoxy, or the paired moieties R and R$^1$ together, or R$^2$ and R$^3$ together independently represent methylenedioxy.

2. A compound of claim 1 wherein the compound is N-(3,4-dimethoxyphenethyl)-α-fluorophenylacetamide.

3. A compound of claim 1 wherein the compound is N-(3,4-dimethoxyphenethyl)-α-chlorophenylacetamide.

4. A compound of claim 1 wherein the compound is N-(3,4-dimethoxyphenethyl)-α-bromophenylacetamide.

5. A compound of claim 1 wherein the compound is N-phenethyl-α-fluorophenylacetamide.

6. A compound of claim 1 wherein the compound is N-(4-methoxyphenethyl)-α-fluorophenylacetamide.

7. A compound of claim 1 wherein the compound is N-(4-ethoxyphenethyl)-α-fluorophenylacetamide.

8. A compound of claim 1 wherein the compound is N-(4-chlorophenethyl)-α-fluorophenylacetamide.

9. A compound of claim 1 wherein the compound is N-(4-nitrophenethyl)-α-fluorophenylacetamide.

10. A compound of claim 1 wherein the compound is N-(3,4-dimethoxyphenethyl)-α-fluoro - 3,4 - dimethoxyphenylacetamide.

11. A compound of claim 1 wherein the compound is N-(3,4-dichlorophenethyl)-α-fluorophenylacetamide.

12. A compound of claim 1 wherein the compound is N-(3,4-dimethoxyphenethyl)-α-fluoro - 3,4 - methylenedioxyphenylacetamide.

13. A compound of claim 1 wherein the compound is N-(3,4-dimethoxyphenethyl)-α-fluoro - 3,4 - dichlorophenylacetamide.

References Cited

UNITED STATES PATENTS

| | | | |
|---|---|---|---|
| 2,362,128 | 11/1944 | Gertler et al. | 260—340.5 |
| 2,608,581 | 8/1952 | Zienty | 260—559 R |
| 3,474,140 | 10/1969 | Ehrhart et al. | 260—559 R |
| 3,239,520 | 3/1966 | Van Proosdij-Hartzema | 260—340.5 |

ALEX MAZEL, Primary Examiner

J. H. TURNIPSEED, Assistant Examiner

U.S. Cl. X.R.

260—558 P, 559 R; 424—282

PO-1050
(5/69)

UNITED STATES PATENT OFFICE
CERTIFICATE OF CORRECTION

Patent No. 3,732,253  Dated May 8, 1973

Inventor(s) Bruno Cavalleri and Anna Sardi

It is certified that error appears in the above-identified patent and that said Letters Patent are hereby corrected as shown below:

Column 2, line 68, "dimethoxyphenyl" should be -- dimethoxyphenethyl --;

Column 3, line 11, "dimethoxyphenyl" should be -- dimethoxyphenethyl --;

Column 3, line 20, "chlorophenylacetamide" should be -- bromophenylacetamide --.

Signed and sealed this 8th day of October 1974.

(SEAL)
Attest:

McCOY M. GIBSON JR.
Attesting Officer

C. MARSHALL DANN
Commissioner of Patents

C-Lp. 441